(12) United States Patent
Zuber et al.

(10) Patent No.: US 10,778,563 B1
(45) Date of Patent: Sep. 15, 2020

(54) BRICK IDENTIFIER ATTRIBUTE FOR ROUTING IN MULTI-TIER COMPUTER NETWORKS

(71) Applicant: Amazon Technologies, Inc., Seattle, WA (US)

(72) Inventors: Owais Bin Zuber, Dublin (IE); Asim Riaz, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/933,197

(22) Filed: Mar. 22, 2018

(51) Int. Cl.
*H04L 12/707* (2013.01)
*H04L 12/717* (2013.01)
*H04L 12/721* (2013.01)
*H04L 29/08* (2006.01)
*H04L 12/751* (2013.01)
*H04L 12/715* (2013.01)

(52) U.S. Cl.
CPC .............. *H04L 45/02* (2013.01); *H04L 45/04* (2013.01); *H04L 69/329* (2013.01)

(58) Field of Classification Search
CPC ........ H04L 45/02; H04L 45/04; H04L 69/329
See application file for complete search history.

(56) References Cited

U.S. PATENT DOCUMENTS

| | | | | |
|---|---|---|---|---|
| 6,963,575 B1* | 11/2005 | Sistanizadeh | ....... | H04L 12/4625 370/401 |
| 7,080,161 B2* | 7/2006 | Leddy | ..................... | H04L 43/00 370/392 |
| 7,471,632 B2* | 12/2008 | Netravali | ................ | H04L 45/02 370/238 |
| 7,532,631 B2* | 5/2009 | Raszuk | .................... | H04L 45/02 370/401 |
| 7,656,819 B2* | 2/2010 | Patel | ....................... | H04L 45/02 370/254 |
| 7,675,912 B1* | 3/2010 | Ward | ....................... | H04L 45/02 370/392 |
| 8,121,136 B2* | 2/2012 | Asati | ....................... | H04L 45/00 370/225 |
| 8,223,629 B2* | 7/2012 | Decraene | ................ | H04L 45/02 370/219 |
| 8,700,801 B2* | 4/2014 | Medved | .................. | H04L 45/02 709/242 |
| 9,054,951 B2* | 6/2015 | Patel | ....................... | H04L 45/04 |
| 9,300,564 B2* | 3/2016 | Previdi | ................... | H04L 43/16 |
| 10,097,449 B2* | 10/2018 | Patel | ....................... | H04L 45/12 |

* cited by examiner

*Primary Examiner* — Huy D Vu
*Assistant Examiner* — Bailor C. Hsu
(74) *Attorney, Agent, or Firm* — Klarquist Sparkman, LLP

(57) ABSTRACT

Technologies are provided for managing routing updates within computer networks using brick identifier (ID) values. For example, brick ID values can be assigned to bricks of routers within a network. When a router of the network receives a routing update, the router can check the brick ID value of the routing update and compare it to its assigned brick ID value. If the brick ID values match, then the router can process the routing update using a preferred procedure. If the brick ID values do not match, then the router can process the routing update using a standard procedure. The preferred procedure can result in faster convergence of routing changes within the network.

18 Claims, 7 Drawing Sheets

BRICK IDENTIFIER ATTRIBUTE FOR ROUTING IN MULTI-TIER COMPUTER NETWORKS

BACKGROUND

Computer networks are widely used to exchange information among computing devices. If there are problems along a path within the network (e.g., network problems, routing problems, congestion, etc.), then users of the network may experience problems accessing services provided by the network (e.g., service interruptions or slowdowns).

Large computer networks are often organized into different network areas, and the different network areas are connected via network connections. For example, the different network areas may each implement their own routing policy. When a network problem occurs with a network connection between network areas, network traffic flow can be disrupted. For example, if a network connection is taken down for maintenance, there may be a period of time during which routing problems can disrupt the flow of network traffic within the network area and/or between the network area and other network areas. Such routing problems can include loops and path hunting. Even a disruption that lasts a number of seconds can significantly impact users that rely on the computer network.

DETAILED DESCRIPTION

Figure 1:
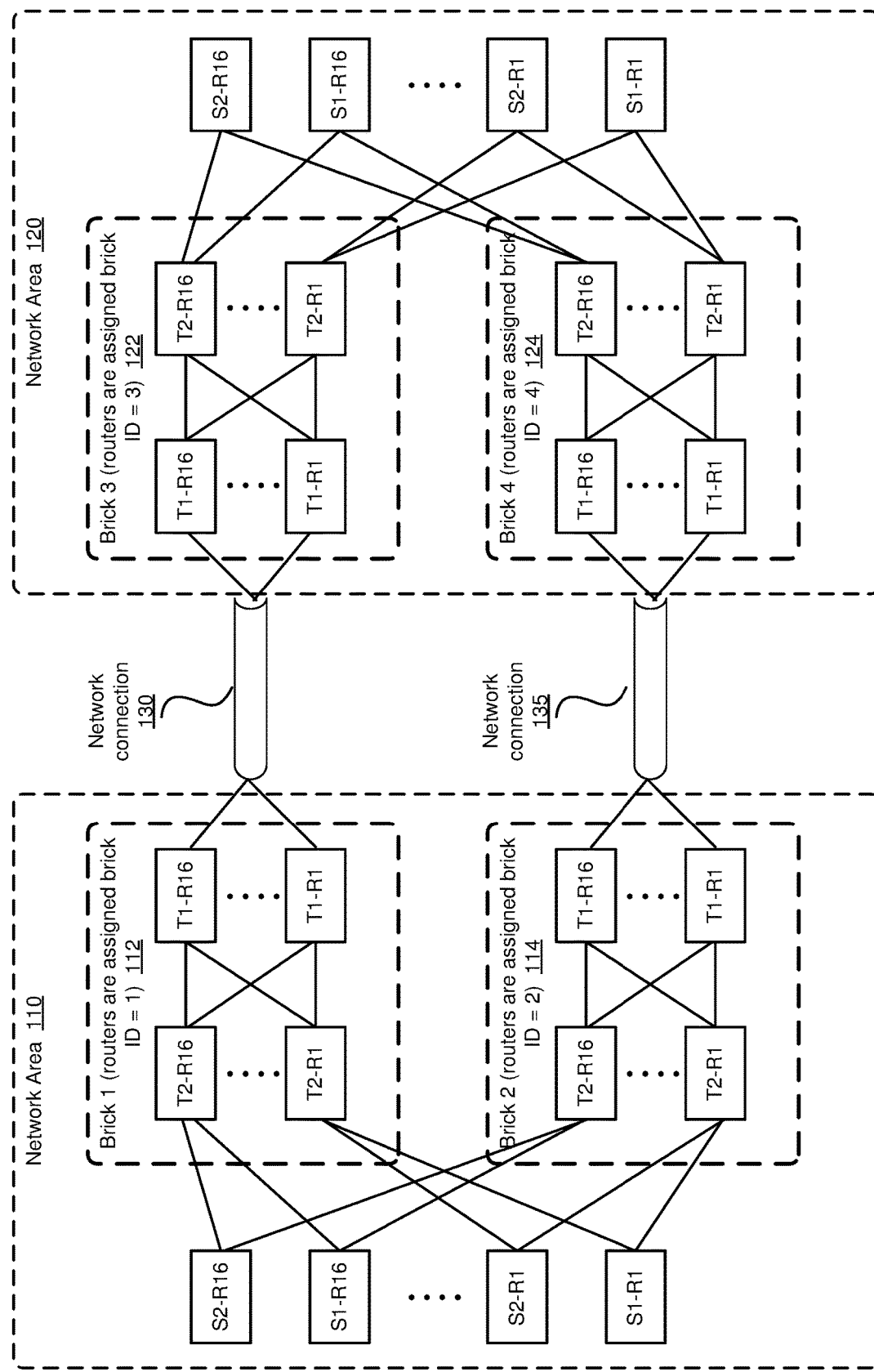
FIG. 1 is a diagram of an example network environment in which routers are grouped into bricks and assigned brick identifier values.

The following description is directed to technologies for managing routing updates within computer networks (e.g., multi-tier networks) using brick identifier (ID) values. For example, brick ID values can be assigned to bricks of routers within a multi-tier network. The routers of a given brick can be assigned the same brick ID value so that each brick of the multi-tier network is assigned a unique brick ID value. When a router of the multi-tier network receives a routing update (e.g., a BGP routing update), the router checks the brick ID value (if any) of the routing update and compares it to its assigned brick ID value. If the brick ID values match, then the router can process the routing update using a preferred procedure. For example, the router can process the routing update as an intra-brick preferred routing update. If the brick ID values do not match, then the router can process the routing update using a standard procedure. For example, the router can process the routing update as an inter-brick routing update (e.g., using a standard BGP path selection process). When using a preferred procedure, routing updates can be processed more efficiently resulting in faster convergence, which can reduce or eliminate routing problems that can otherwise occur (e.g., routing loops or path hunting). For example, the preferred procedure can use fewer steps than a standard procedure and therefore take less time to process.

In a packet-switched network, there are often multiple network paths that a given network packet can take from a source device to a destination device. The multiple network paths travel along multiple network connections (e.g., wired network connections, such as fiber connections). When there is a problem with a network connection (e.g., a hardware or software failure, congestion, or a network connection that is taken down for maintenance), the routing devices of the network can perform routing updates to route around the problem (e.g., switch from a first network connection to a second network connection for network traffic destined for a specific destination device or destination network). When such a routing change occurs, it takes some amount of time for the network routing to converge (e.g., until all of the routers have updated their routing tables so that they are no longer sending traffic, or advertising routes, over the problem network connection). While the routers of the network converge, a number of routing issues can occur, including last router problems, path hunting problems, and routing loops.

Using the technologies described herein, such network problems that can occur during network convergence can be reduced or eliminated. For example, by preferring intra-brick routes over routes received from other bricks, routing changes within the network can converge more quickly.

A group of routing devices that are grouped together into a unit is referred to as a brick or group. In some implementations, a brick is a group of tier 1 and tier 2 routing devices in a multi-tier network that are grouped together to form a capacity unit. However, routing devices can be grouped together into bricks within network topologies other than multi-tier networks. In general, groups of routing devices can be grouped together into bricks within a network area managed as an autonomous system (AS).

In the technologies described herein, a new attribute is used to identify a brick and the routes associated with the brick. The new attribute is referred to as a brick identifier (ID) (also called a group identifier (ID)). The brick ID attribute is used to identify the routing devices that belong to a given brick. For example, a group of routing devices (e.g., a group of tier 1 and tier 2 routing devices in a multi-tier network) can be assigned the same brick ID value. Other groups of routing devices can be assigned other brick ID values. In this way, the routers of each brick can be assigned their respective brick ID value, and the routers of the different bricks can be distinguished based on their assigned brick ID values.

The brick ID attribute is also used to identify advertised routes. For example, a route that is advertised by a router can be associated with a brick ID attribute having a value of the router's brick ID. Another router that receives the advertised route can check the brick ID attribute associated with the advertised route and make decisions based on the value of the brick ID attribute. For example, intra-brick advertised routes can be preferred over inter-brick advertised routes.

In some implementations, the brick ID attribute is a BGP attribute. For example, the brick ID attribute can be an 8-bit optional non-transitive BGP attribute that can be used to uniquely identify up to 255 bricks within a network area (e.g., within a multi-tier network). In some implementations, brick ID values are unique within a BGP ASN, but do not have to be unique across BGP ASNs.

The brick ID value can be assigned to a router in a number of ways. For example, brick ID values can be assigned to routers as a manual configuration procedure (e.g., using a command line tool). Brick ID values can also be assigned using an automated procedure. For example, routers can automatically determine and assign brick ID values based on their hostname and/or based on other attributes or settings of the routers.

Using the technologies described herein can provide advantages in terms of availability and/or reliability of the computer network. For example, a network problem, such as a routing loop, can disrupt network traffic for any network traffic that is using the routing devices involved in the routing loop. By using brick ID values to managing routing updates, changes to routing within the computer network can converge more quickly and thus avoid network problems and network disruptions.

FIG. 1 is a diagram of an example network environment 100 in which routers are grouped into bricks and assigned brick identifier values. In the example network environment 100, a simplified network area 110 is depicted that includes a number of routing devices. The routing devices of network area 110 are organized into a multi-tier network topology (using a Clos like arrangement of interconnections) that has three tiers. Routing devices in the first tier (T1) and the second tier (T2) are grouped into bricks. In this example, two bricks are depicted. Brick 1 (112) contains 16 first tier routers (labeled T1-R1 through T1-R16 in brick 1) and 16 second tier routers (labeled T2-R1 through T2-R16 in brick 1). The routers in brick 1 are each assigned a brick ID value of 1 (e.g., as part of a manual or automatic configuration process). Brick 2 (114) also contains 16 first tier routers and 16 second tier routers. The routers of brick 2 are each assigned a brick ID value of 2. Instead of assigning a value of 1 to brick 1 and a value of 2 to brick 2, other values could be used (e.g., brick 1 could be assigned a brick ID value of 25 and brick 2 could be assigned a brick ID value of 9).

In the network area 110, the second tier routers of brick 1 and brick 2 are connected to the third tier of routers (labeled S1-R1 through S2-R16), also called the spine tier. The spine tier provides network connections between the bricks of the network area 110. In some implementations, the spine tier has a number of rows of spine routers. In the specific example depicted in network area 110, there are two rows of spine routers, a first row of 16 spine routers (labeled S1-R1 through S1-R16) and a second row of spine routers (labeled S2-R1 through S2-R16).

Also depicted in the example network environment 100 is a second example network area 120. Network area 120 is similar to network area 110 and contains a multi-tier network with three tiers. The routers of the first and second tiers are organized into two bricks, brick 3 (122) and brick 4 (124). The routers of brick 3 are assigned a brick ID value of 3, and the routers of brick 4 are assigned a brick ID value of 4. The third tier routers (the spine tier) connects the second tier routers of brick 3 and brick 4.

The two network areas (network area 110 and network area 120) are connected via two network connections. Network connection 130 connects the first tier routers of brick 1 to the first tier routers of brick 3. Network area 135 connects the first tier routers of brick 2 to the first tier routers of brick 4. For example, the network connections 130 and 135 can be fiber connections that carry multiple data channels.

The two network areas (network area 110 and network area 120) represent different areas of the network, such as different data centers or different areas within a data center. For example, network area 110 can represent a multi-tier network that serves computing devices (e.g., computer servers) in one area of a data center and that provides connectivity to network area 120 that serves computing devices in another area of the data center.

Each of the two network areas (network area 110 and network area 120) operates as a different autonomous system (AS) and has a different AS number (ASN). The network areas 110 and 120 run the BGP routing protocol to route network packets within, and between, the network areas. Because the network areas operate as different autonomous systems, the internal BGP (iBGP) routing protocol is used internal to the network areas, and the external BGP (eBGP) routing protocol is used for network traffic external to the network areas (e.g., eBGP is used over the network connections 130 and 135 between the network areas).

When the network connections of the example network environment 100 are operating correctly, network traffic flows within the network areas (between the routers of network area 110 and between the routers of network area 120) and between the network areas (over network connections 130 and 135). However, in some situations, one of the network connections 130 or 135 may experience a problem. For example, network connection 130 can be taken offline for maintenance or may experience a network outage (e.g., a hardware or software failure of one of the connected routers or a failure of the network connection itself). When such an event happens, traffic needs to be re-routed. For example, if network connection 130 is taken offline, then network traffic needs to be re-routed to use network connection 135 to travel between the network areas. The process of determining new routes among the routers of the network areas can be complex and can take some time to settle into a stable configuration, which is referred to as "convergence."

During the time it takes the routes to converge, a number of routing problems can occur. A first routing problem is the last router problem. The last router problem occurs when network traffic is being shifted away from a first tier router (e.g., when a network connection is taken offline) and capacity is reduced to zero over a period of time (e.g., a number of seconds). Consider an example situation where network connection 130 is being taken offline for maintenance. In response, network policy is changed on the first tier (T1) routers of brick 1 to de-prefer the route over network connection 130. However, the network policy change occurs over a period of time. For example, the network policy change could begin with router T1-R1 and finish two seconds later with router T1-R16. During this two-second time period, the capacity is slowly decreasing (e.g., an equal-cost multi-path routing (ECMP) group will be decreasing on the T2 routers, as each T1 router is switched over the two seconds). This results in congestion as the entire network traffic for network connection 130 is being sent over an increasingly small number of T1 routers in brick 1.

A second routing problem is the path hunting problem. Path hunting occurs on the second tier (T2) routers. The T2 routers will also experience the reduction in capacity as the policy is applied over the period of time. During this time, the T2 routers will be adjusting their best path and advertising routing updates to the spine (S1 and S2) routers.

A third routing problem is micro loops. Micro loops occur due to the difference in the time it takes BGP routing to converge at the control plane level and the time it takes the routes to be configured at the router (to converge at the data plane where the hardware or application-specific integrated circuit (ASIC) is programmed with the routes that will be used to forward network packets). For example, micro loops can occur between spine routers and T2 routers. For example, the spine routes can fully converge before the T2 routers (e.g., because there are fewer next hops on the spine routers than there are at the T2 routers). If the spine routers converge first at the data plane, then a given spine router can send network traffic to a specific T2 router, and because the specific T2 router has not yet converged (e.g., it may have converged at the control plane, but not at the data plane) it may send traffic back to the spine router, resulting in a micro loop that lasts until the T2 router fully converges. With reference to network area 110, this situation could occur when traffic is being shifted away from network connection 130 in favor of network connection 135. For example, a micro loop could form between S1-R1 and T2-R1 in brick 2 (114) until T2-R1 fully converges and switches its best path to use T1-R1 in brick 2 to traverse network connection 135. As another example, micro loops can form when a network connection returns to service. For example, consider a scenario where network connection 135 was taken offline for maintenance and traffic was shifted away from network connection 135 to network connection 130. At this point, the T2 routers in brick 2 (114) are pointing to the spine routers. After some period of time, network connection 135 is being brought back online. Upon the network traffic being shifted back to network connection 135, the spine routers will converge first. However, until the T2 routers in brick 2 converge at the data plane (e.g., which could take a number of seconds), the T2 routers in brick 2 will continue to point back at the spine routers. This will cause a micro loop. As the above scenarios illustrate, micro loops can occur between T2 routes and spine routes when network traffic is being shifted away from a network connection and when network traffic is being shifted back to a network connection.

The technologies described herein using brick identifier attributes and values can be applied to reduce or eliminate some or all of these problems during convergence. For example, by assigning brick ID values to routers of the network area, and associating brick ID attributes with routing updates, the routers can be prepared or "pre heated" so that they are ready when one part of the network (e.g., the spine routers) converges, and the difference in convergence times can be reduced or eliminated. As an example, if the T1-R1 router in brick 2 identifies a new best path route via network connection 135 and advertises it to the T2-R1 router in brick 2, the T2-R1 router in brick 2 can prefer that route because it is advertised with the same brick ID value. In some implementations, T2 routers in a brick always prefer the path from local brick T1 routers (local brick routing updates are those with the same brick ID value) due to brick identifier check, even though the network path is depreferred (e.g., longer AS-PATH or local-preference). In such scenarios, the spine routers are executing the standard BGP best path selection process to make the decision to route traffic over best and alternate network paths. This can eliminate a potential micro loop between the T2-R1 router in brick 2 and the S1-R1 spine router.

In some implementations, routes (e.g., all routes) that are learned by routers from external networks (e.g., over eBGP connections) are tagged with a brick ID attribute having a value of the router that learned the route. For example, if router T1-R1 in brick 1 learns a route from router T1-R1 in brick 3, then router T1-R1 in brick 1 can add the brick ID attribute to the learned route and assign it a brick ID value of 1. In some implementations, brick ID attributes are only added to routes by the T1 routers because the T1 routers are the ones that connect to external networks (e.g., the only ones that receive BGP updates over eBGP connections). In some implementations, routes that are learned over network connections other than eBGP connections can be tagged with a brick ID attribute.

In some implementations, brick ID attributes are only included with routes advertised within a network area (e.g., within a multi-tier network) and not to external networks (e.g., to other autonomous systems). In this way, brick ID attributes and associated values can be added to the routes of a routing update (e.g., received from external networks over eBGP connections) and the brick ID values can be preserved when the routing update is passed along within the network area (e.g., over iBGP connections). For example, when router T1-R1 in brick 1 (112) receives a routing update from router T1-R1 in brick 3 (122), a brick ID attribute can be added to the routes with a value of 1. In this case, the T1-R1 router in brick 1 is the ingress router. When router T1-R1 in brick 1 sends out a routing update for the received routes to another router within the network area 110, such as to router T2-R1 in brick 1, then the routing update will still have the brick ID attribute with a value of 1 (which was set by the ingress router T1-R1 in brick 1). When router T2-R1 in brick 1 sends out a routing update for the received routes to a spine router, such as S2-R1, the routing update will still have the brick ID attribute with a value of 1. When router S2-R1 sends out a routing update for the received routes to a router in brick 2, such as router T2-R1 in brick 2, the routing date will still have the brick ID attribute with a value of 1, and so on. Brick ID attributes can be removed for routes advertised from routers of network area 110 to routers external to network area 110 (e.g., to routers in network area 120 and to routers in any other network areas). Network area 120 can operate in the same manner. For example, if router T1-R16 in brick 2 is advertising a route to router T1-R16 in brick 4, then the router T1-R16 in brick 2 can remove any brick ID attribute so that the advertised routes do not include a brick ID attribute or associated value. In some implementations, this is accomplished by only advertising brick ID attributes over iBGP connections, and not over eBGP connections.

In some implementations, routes learned from routing updates are preferred if they have the same brick ID value as the router receiving the routing updates, and such routing updates are processed as intra-brick preferred routing updates. In other words, routers prefer intra-brick routes over other routes (e.g., over inter-brick routes). For example, if router T2-R1 in brick 2 receives a routing update from router T1-R1 in brick 2 that is tagged with a brick ID attribute with a value of 2, then the router T2-R1 in brick 2 will compare the brick ID attribute value of the received route with its own associated brick ID value. Upon determining that they are the same (in this example, they are both 2), the router T2-R1 in brick 2 will prefer that route (e.g., over another route that is associated with a brick ID attribute with a value of 1, which would be an inter-brick route).

Brick ID values can be used to influence the BGP path selection process (also called the BGP best path selection process, which can reduce or eliminate some of the convergence problems that can otherwise occur. The BGP path selection process can be modified to prefer intra-brick routes (also called intra-group routes) over inter-brick routes (also called inter-group routes). For example, brick ID values can be considered after the BGP weight attribute.

In the standard BGP path selection process, the following steps are performed:
Prefer higher weight.
Prefer local preference.
Prefer locally originated route.
Prefer shortest hop-count AS_PATHs.
Prefer the lowest origin type route. That is, prefer IGP origin routes to EGP, to incomplete routes.
Where routes with a MED are received from the same AS, prefer the route with the lowest MED.
Prefer the route received from an external, eBGP peer over routes received from other types of peers.
Prefer the route with the lower IGP cost.
Multi-path check
Already-selected external check
Router-ID check
Cluster-List length check Using brick ID values, the standard BGP path selection process can be reduced to a fewer number of steps, which can significantly reduce the time it takes for routes to converge (e.g., which can reduce or eliminate network issues, such as micro loops). The modified BGP path selection process can be used when processing intra-brick routing updates. In some implementations, using brick ID values results in the following steps being performed as a modified BGP path selection process:
Brick ID check
Multiple path check
Router ID check to select the route with the lowest router ID.

Figure 2:
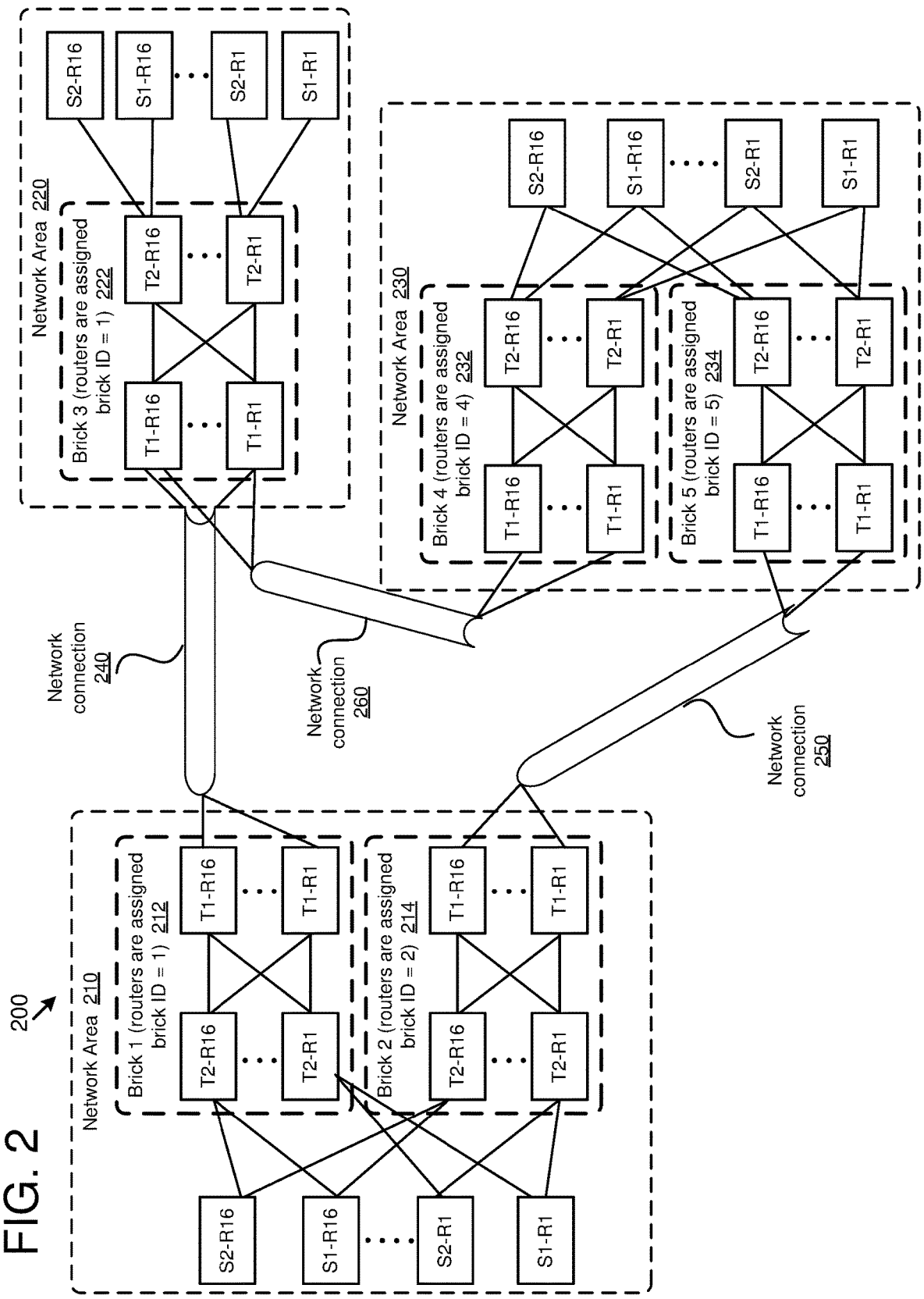
FIG. 2 is a diagram of an example network environment in which routers in three network areas are grouped into bricks and assigned brick identifier values.

FIG. 2 is a diagram of an example network environment 200 in which routers in three network areas are grouped into bricks and assigned brick identifier values. The example network environment 200 is similar to the example network environment 100, except that there are three separate network areas depicted with network connections between them. However, network environments are not limited to the example network environment depicted in FIG. 2, and the technologies described herein can be implemented in network environments in which routers are grouped together into bricks and that route network traffic among other bricks of routers. In general, there can be any number of different network areas that are connected in various ways. The routing devices of a given network area can be grouped into one or more bricks. Furthermore, the network devices of the network areas can be organized into different types of network topologies (e.g., multi-tier networks or network topologies other than multi-tier networks).

Network areas 210, 220, and 230 contain routers organized into multi-tier networks with first tier and second tier routers organized into bricks. Network area 210 has two bricks, brick 1 (212) and brick 2 (214). The routers of brick 1 are assigned a brick ID value of 1 and the routers of brick 2 are assigned a brick ID value of 2. However, other brick ID values could be used (e.g., brick ID values of 25 and 26) so long as the brick ID values within a given network area are unique. However, brick ID values do not have to be unique across different network areas. Network area 220 has one brick, brick 3 (222). The routers in brick 3 are assigned a brick ID value of 1. As brick 3 illustrates, the brick ID values do not have to be unique across network areas in some implementations. While network area 210 has a brick with a brick ID value of 1 it will not conflict with brick 3 in network area 220 in implementations where brick ID values are not passed between network areas (e.g., not included in eBGP routing updates). Network area 230 has two bricks, brick 4 (232) and brick 5 (234). The routers of brick 4 are assigned a brick ID value of 4 and the routers of brick 5 are assigned a brick ID value of 5.

The network areas 210, 220, and 230 represent different areas of the network, such as different data centers or different areas within a data center. For example, each network area 210, 220, and 230 can represent a multi-tier network that serves computing devices (e.g., computer servers) in its respective area of a data center. Each network area 210, 220, and 230 operates as its own AS and runs the BGP routing protocol. In some implementations, iBGP is used within a network area and eBGP is used between network areas.

The network areas are connected to one another via network connections. In the example network environment 200, network area 210 is connected to network area 220 via network connection 240, network area 220 is connected to network area 230 via network connection 260, and network area 210 is connected to network area 230 via network connection 250. For example, the network connections 240, 250, and 260 can be fiber connections that carry multiple data channels.

The example network environment 200 can experience the same routing problems discussed with regard to example network environment 100 (e.g., last router, path hunting, and micro loops). The technologies described herein using brick identifier attributes and values can be applied to reduce or eliminate some or all of these problems during convergence, as discussed with regard to example network environment 100. For example, brick ID values can be used to influence the BGP best path selection process, which can reduce or eliminate some of the convergence problems that can otherwise occur. The BGP best path selection process can be modified to prefer intra-brick routes over inter-brick routes. For example, brick ID values can be considered after the BGP weight attribute in the path selection process.

Using the example network environment 200, the micro loops routing problem can be more easily illustrated. Consider a first routing state within the network where network traffic is being forwarded to a computing device in network area 220 and in which routers of network area 210 are currently configured to route traffic over network connection 240 in order to reach destinations in network area 220. According to the first routing state, router T1-R1 in brick 2 forwards traffic to router T2-R1 in brick 2, then to router S2-R1, then to router T2-R1 in brick 1, then to router T1-R1 in brick 1, then to router T1-R1 in brick 3 (via network connection 240), and so on until the destination computing device is reached. Next, consider a second routing state within the network where network connection 240 is being taken offline (e.g., for maintenance). In preparation for taking network connection 240 offline, the routing policy for routers T1-R1 through T1-R16 in brick 1 is changed to shift traffic away from network connection 240. In some implementations, this is accomplished by switching from a standard routing policy to a maintenance routing policy that adds additional AS numbers (ASNs) to the prefixes that use paths over network connection 240 (e.g., adds three ASNs to the AS_PATHs). When the routing policy is changed, the T1 routers in brick 1 will send BGP routing updates to the other routers in the network area 210 (e.g., which results in paths over network connection 240 being de-preferred). For example, router T1-R1 in brick 1 will send a BGP update to router T2-R1 in brick 1, which will send a BGP routing update to spine router S2-R1, which will send a BGP routing update to router T2-R1 in brick 2, which will send a BGP routing update to router T1-R1 in brick 2. In response, a new best path to network area 220 will be identified. For example, router T1-R1 in brick 2 will identify a new best path via network connection 250, and will send a BGP routing update to the other routers, such as to router T2-R1 in brick 2, which will send a BGP routing update to spine router S2-R1, and so on. However, a problem can occur where the data plane of the spine routers, such as S2-R1, converges first. For example, spine router S2-R1 has programmed its data plane to forward network traffic destined for network area 220 to router T2-R1 in brick 2. But, if router T2-R1 in brick 2 has not yet converged at the data plane (e.g., it has just converged at the control plane), then router T2-R1 in brick 2 will forward network traffic destined for network area 220 back to spine router S2-R1 (the data plane of router T2-R1 in brick 2 is still programmed as if network connection 240 is the best path). This will result in a micro loop where network traffic is forwarded back and forth between spine router S2-R1 and router T2-R1 in brick 2 until the data plane at router T2-R1 converges, at which time router T2-R1 in brick 2 will forward network traffic to T1-R1 in brick 2 (and eventually to its destination in network area 220 via network connection 250, network area 230, and network connection 260). In general, when switching away from network connection 240, micro loops will occur between the spine routers and the T2 routers in brick 2 (e.g., in other words, micro loops will occur on the alternate path, which is the path leading to network connection 250). This happens because before the shifting away happens, the T2 routers in brick 2 were pointing to the spine routers and after the shifting away the T2 routers in brick 2 are still pointing at the spine until they converge at the data plane. Similarly, when switching back to network connection 240 (e.g., when network connection 240 is brought back up after maintenance has finished), micro loops will occur between the T2 routers in brick 1 and the spine routers.

Using brick ID values can reduce or eliminate the occurrence of micro loops. For example, using the above situation where network connection 240 is being taken offline, the brick ID values can be used in the path selection process so that router T2-R1 in brick 2 converges before spine router S2-R1 begins sending network traffic and a micro loop is not formed. For example, when router T1-R1 in brick 2 identifies the new best path via network connection 250, router T1-R1 in brick 2 can send a BGP routing update with a brick ID value of 2. The BGP routing update will be received by router T2-R1 in brick 2, which will compare its assigned brick ID value to the value of the brick ID attribute in the BGP routing update. Upon determining that they match (in this example they are both 2), router T2-R1 in brick 2 will prefer the route (it is an intra-brick route) and converge at the data plane (e.g., use the modified BGP best path selection process which prefers intra-brick routes over inter-brick routes, such as the three-step process described herein). Because router T2-R1 in brick 2 will converge more quickly using brick ID values, when spine router S2-R1 sends network traffic destined for network area 220 to router T2-R1 in brick 2, router T2-R1 in brick 2 will have already converged and therefore will forward the network traffic on to router T1-R1 in brick 2.

In the network areas depicted in the example network environment 100 and 200, the routers organized into a specific topology of a multi-tier network with three tiers. However, in general the routers can be organized into other topologies, such as multi-tier networks with a different number of tiers or a type of network topology other than a multi-tier network. In addition, the routers of the network areas can be grouped into bricks using different criteria (e.g., other than grouping first tier and second tier routers).

In some implementations, the path selection process that is used depends on whether the routing update has an associated brick ID attribute and whether its value matches the router applying the routing update. In some situations, the standard BGP path selection process will be used. For example, when routing updates are received over eBGP connections, they are assigned brick ID attributes and values, and processed using the standard BGP path selection process. When routing updates are received over iBGP connections by spine routers, they will also use the standard BGP path selection process because spine routers do not have an assigned brick ID value. When routing updates are received over iBGP connections, and the brick ID value does not match the brick ID value of the router receiving the update, then the standard BGP path selection process will be used. In some situations, a modified BGP path selection process will be used (e.g., one that uses fewer steps than the standard BGP path selection process, such as the three-step modified BGP path selection process). For example, when routing updates are received over iBGP connections and the brick ID value matches the brick ID value of the router receiving the update, then the modified BGP path selection process will be used.

Figure 3:
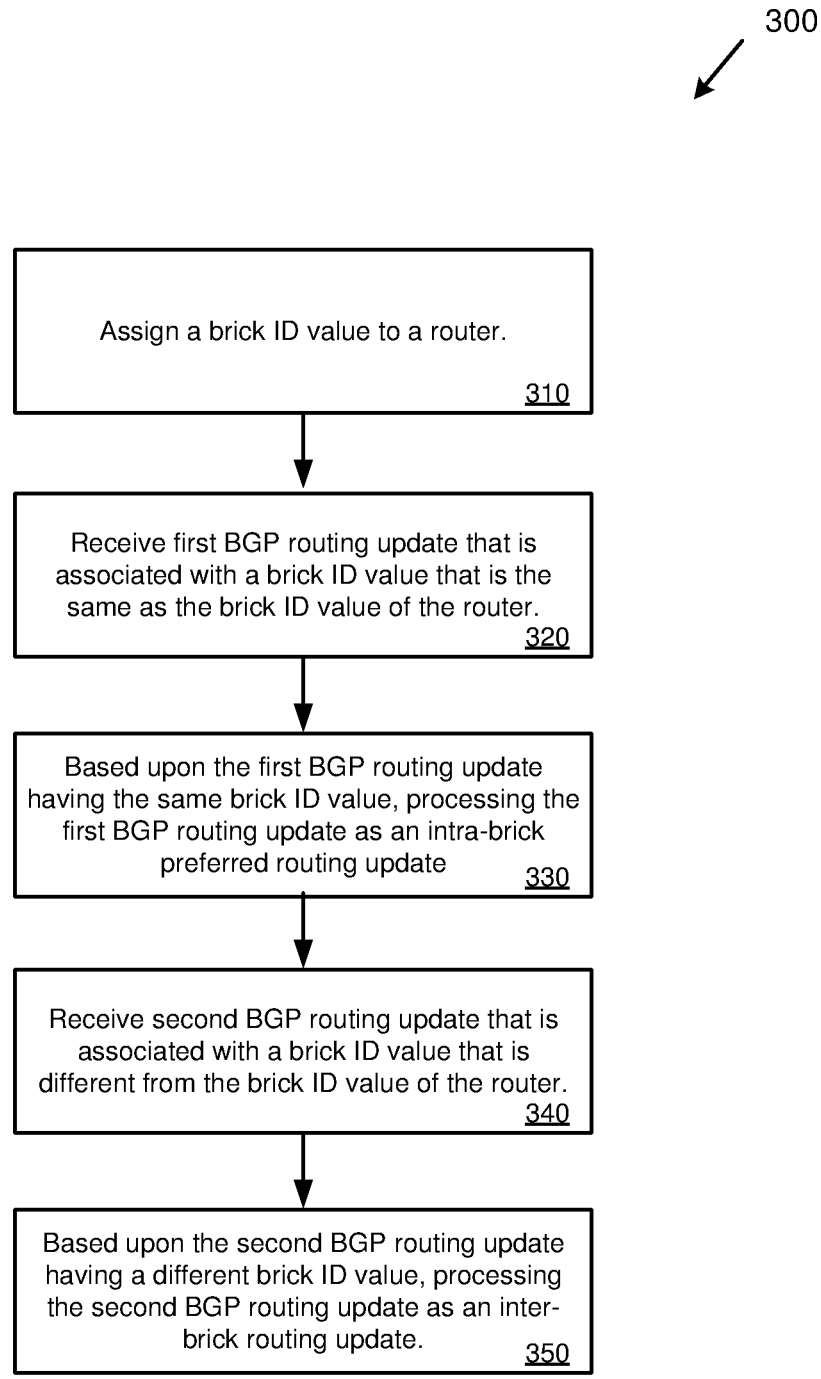
FIG. 3 is a flowchart of an example method for using brick identifier values for managing BGP routing updates within a multi-tier network.

FIG. 3 is a flow chart of an example method 300 for using brick ID values for managing BGP routing updates within a multi-tier network. The example method can be used to prefer intra-brick routing updates and can be performed by a router (e.g., a network device that routes network packets within a packet-switched network). For example, the example method 300 can be implemented by one of the routers depicted in example network environment 100 or example network environment 200.

At 310, brick ID value is assigned to a router. The router operates as part of a brick of routers within a multi-tier network, and the routers of the multi-tier network are organized into a plurality of bricks. Each brick is assigned a unique brick ID value within the multi-tier network.

At 320, the router receives a first BGP routing update. The first BGP routing update is associated with a brick ID value (e.g., the routes in the routing update have a brick ID attribute which is set to the value) that is the same as the brick ID value associated with the router (that was assigned at 310).

At 330, based upon the first BGP routing update having the same brick ID value as the router, processing, the first BGP routing update is processed as an intra-brick preferred routing update. For example, the intra-brick preferred routing update is processed using a fewer number of steps than a standard BGP path selection process, which results in faster convergence than the standard BGP path selection process.

At 340, the router receives a second BGP routing update. The second BGP routing update is associated with a brick ID value that is different form the brick ID value associated with the router.

At 350, based upon the second BGP routing update having the different brick ID value from the router, processing the second BGP routing update as an inter-brick routing update. For example, the inter-brick routing update can be processed using the standard BGP path selection process.

Figure 4:
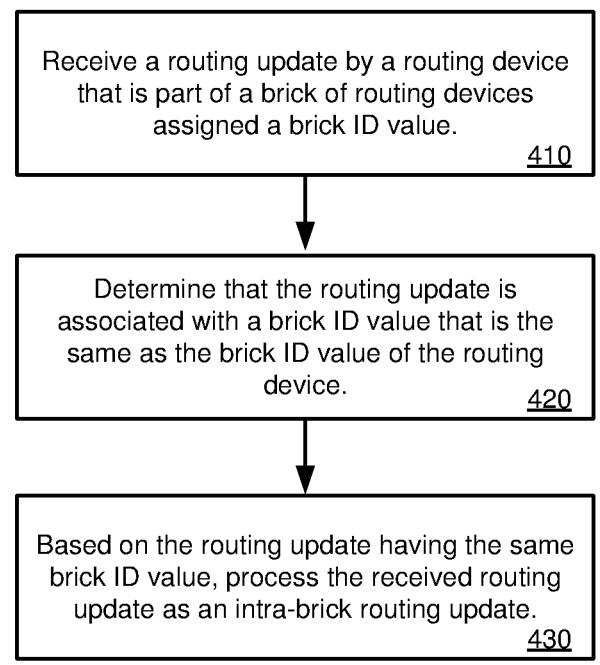
FIG. 4 is a flowchart of an example method for using brick identifier values for managing routing updates within a network.

FIG. 4 is a flow chart of an example method 400 for using brick ID values for managing routing updates within a computer network. The example method can be used to prefer intra-brick routing updates and can be performed by a routing device (also called a router). For example, the example method 400 can be implemented by one of the routers depicted in example network environment 100 or example network environment 200.

At 410, a routing update (e.g., a BGP routing update) is received by a routing device that is part of a brick of routing devices within a network area that are assigned a same brick ID value. In some implementations, the routing device is part of a multi-tier network in which at least a portion of the routing devices are organized into bricks.

At 420, the routing update is determined to be associated with a brick ID value that is the same as the brick ID value of the routing device. For example, the routing device can obtain the brick ID value associated with the routing update from brick ID attributes of the routes in the routing update.

At 430, based upon the routing update having the same brick ID value, the routing update is processed as an intra-brick routing update. For example, the intra-brick routing update is processed using a fewer number of steps than a standard BGP path selection process, which results in faster convergence than the standard BGP path selection process.

Figure 5:
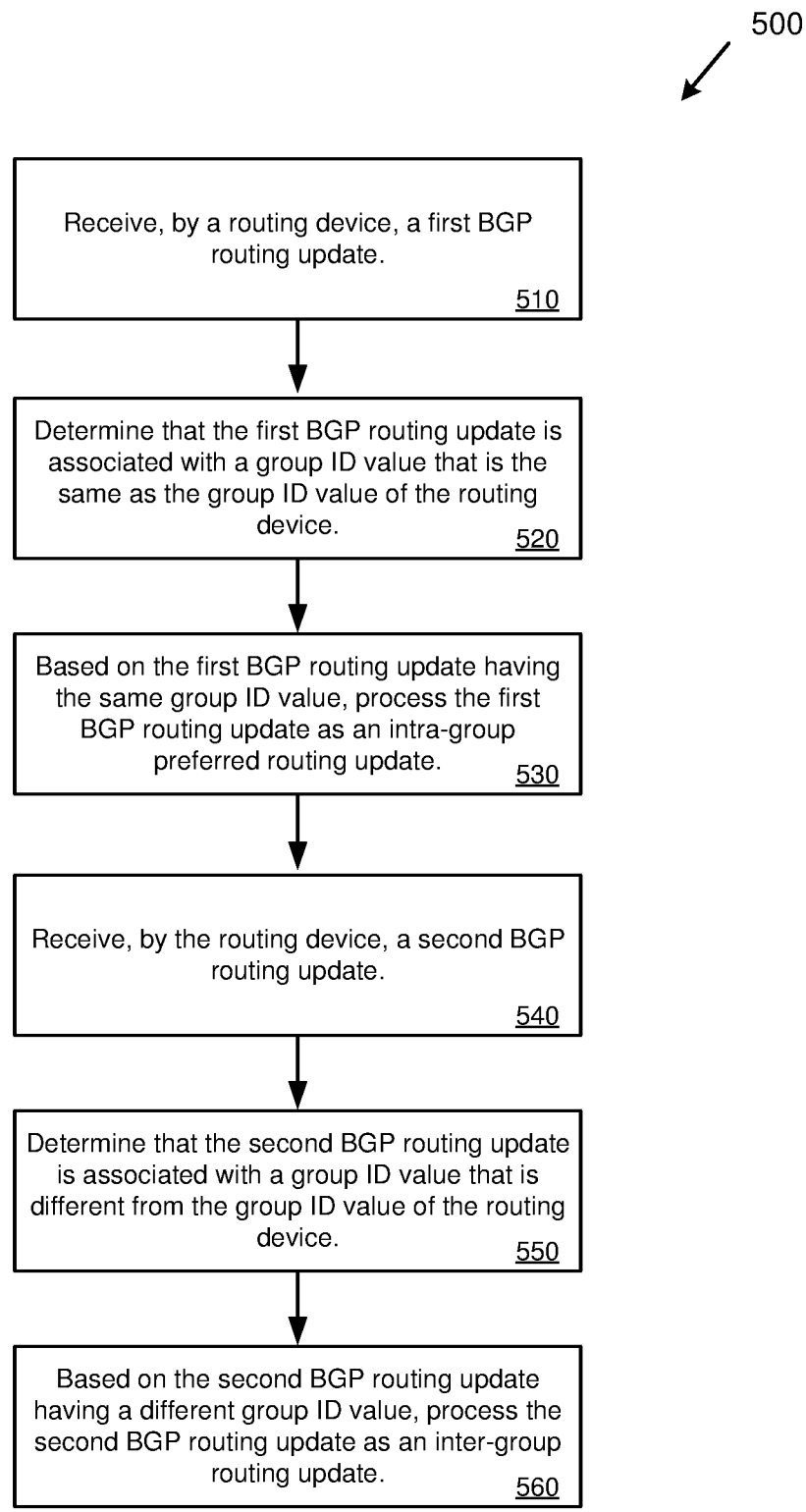
FIG. 5 is a flowchart of an example method for using group identifier values for managing BGP routing updates within a multi-tier network, including processing intra-group updates and inter-group updates.

FIG. 5 is a flow chart of an example method 500 for using group ID values for managing BGP routing updates within a multi-tier network, including processing intra-group updates and inter-group updates. The example method can be performed by a routing device. For example, the example method 500 can be implemented by one of the routers depicted in example network environment 100 or example network environment 200.

At 510, a first BGP routing update is received by a routing device. The routing device is part of a group of routing devices within a network area (e.g., within a multi-tier network). The routing devices in the group are assigned the same group ID value.

At 520, the first BGP routing update is determined to be associated with a group ID value that is the same as the group ID value of the routing device. At 530, based upon the first BGP routing update having the same group ID value, the first BGP routing update is processed as an intra-group preferred routing update. For example, the intra-group preferred routing update is processed using a fewer number of steps than a standard BGP path selection process, which results in faster convergence than the standard BGP path selection process.

At 540, a second BGP routing update is received by the routing device. At 550, the second BGP routing update is determined to be associated with a group ID value that is different from the group ID value of the routing device. At 560, based upon the second BGP routing update having a different group ID value, the second BGP routing update is processed as an inter-group routing update. For example, the inter-group routing update uses a standard BGP path selection process.

Figure 6:
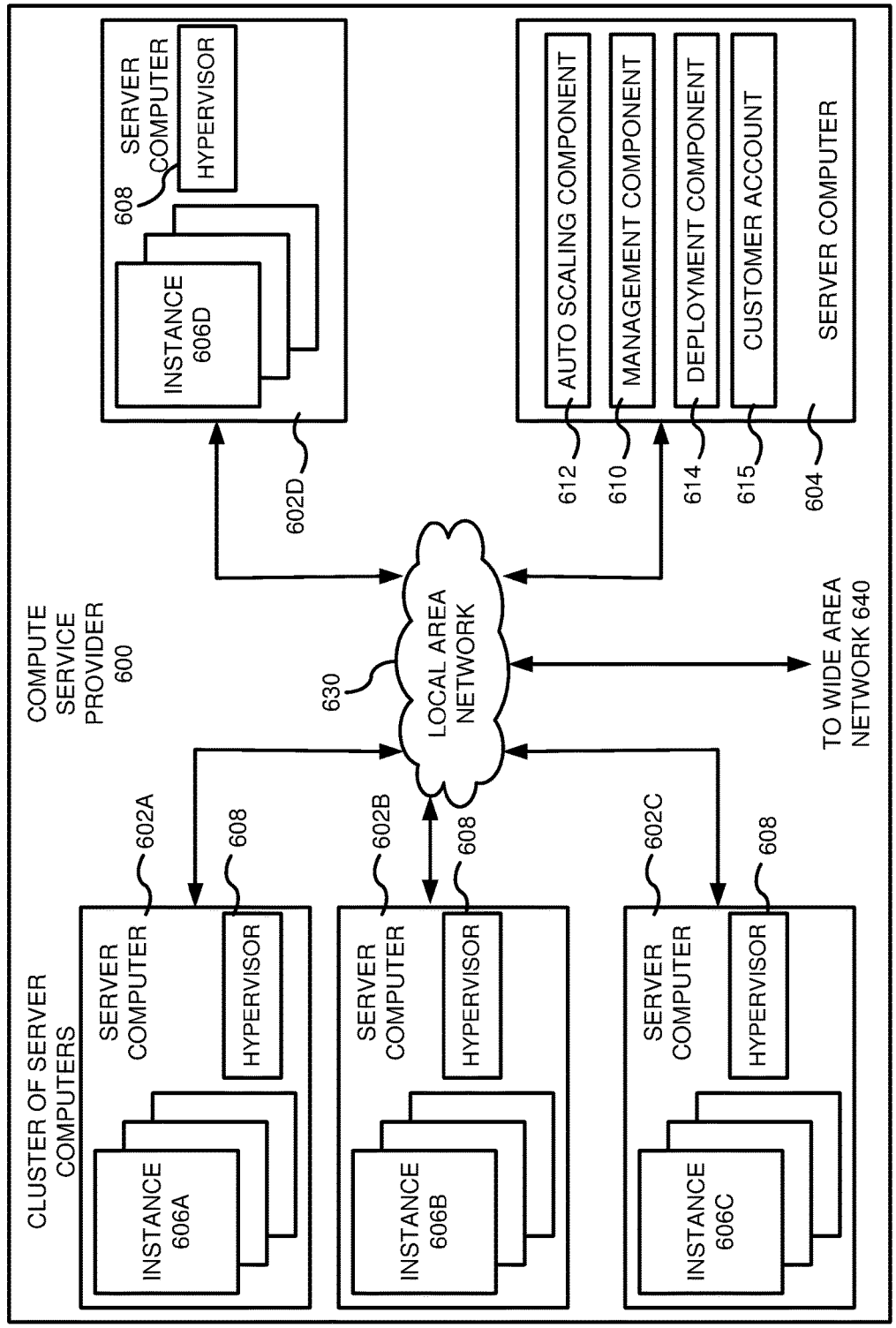
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN), such as a multi-tiered network (e.g., Clos network), and can be connected to a wide area network (WAN) 640 so that end users can access the compute service provider 600. The wide area network 640 can connect to a border network fabric providing access to the internet and/or to other networks (e.g., peering connections to other network areas). It should be appreciated that the network topology illustrated in FIG. 6 has been simplified and that many more networks and networking devices can be utilized to interconnect the various computing systems disclosed herein.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.)

Figure 7:
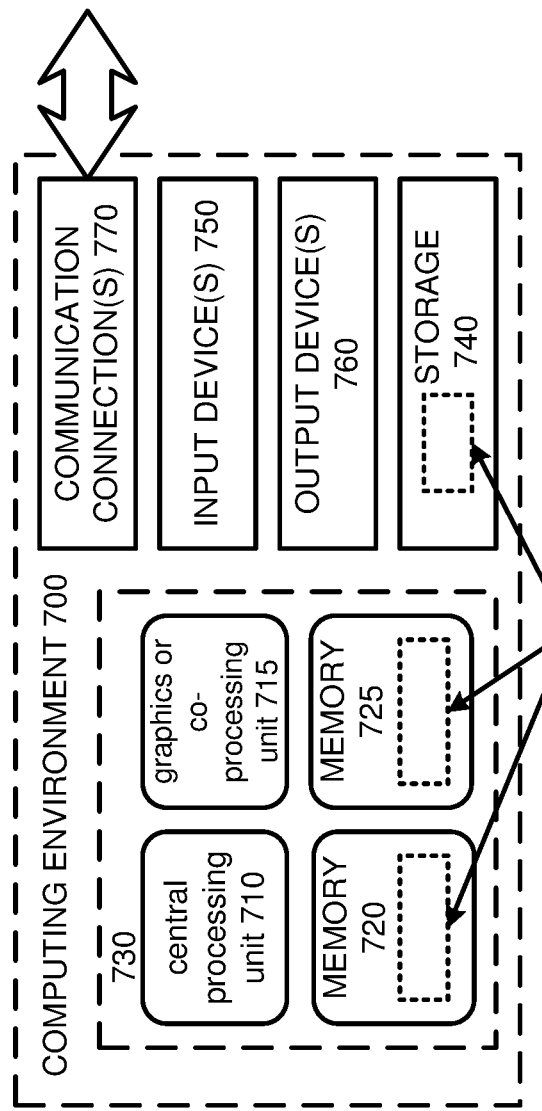
FIG. 7 depicts a generalized example of a suitable computing environment in which the described innovations may be implemented.

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A method, implemented by a router, the method comprising:
    assigning a brick identifier (ID) value to the router, wherein the router operates as part of a brick of routers within a multi-tier network, wherein routers within the multi-tier network are organized into a plurality of bricks, wherein each brick is assigned a unique brick ID value within the multi-tier network, and wherein brick ID is an attribute used for border gateway protocol (BGP) best path selection;
    receiving, by the router, a first BGP routing update that is associated with a brick ID value that is a same value as the brick ID value of the router receiving the BGP routing update;
    based upon the first BGP routing update having the same brick ID value as the router, processing the first BGP routing update as an intra-brick preferred routing update, wherein the intra-brick preferred routing update is processed using a fewer number of steps than the number of steps required in a step for performing a standard BGP path selection process;
    receiving, by the router, a second BGP routing update that is associated with a brick ID value that is different from the brick ID value of the router receiving the second BGP routing update; and
    based upon the second BGP routing update having the different brick ID value from the router, processing the second BGP routing update as an inter-brick routing update that is not processed as an intra-brick preferred routing update, wherein the inter-brick routing update is processed using the standard BGP path selection process.

2. The method of claim 1, wherein the first and second BGP routing updates are received over internal BGP (iBGP) sessions from other routers within the multi-tier network.

3. The method of claim 1, wherein the intra-brick preferred routing update converges faster than the standard BGP path selection process.

4. The method of claim 1, wherein the multi-tier network is associated with an autonomous system number (ASN), and wherein the multi-tier network is directly connected to a plurality of other multi-tier networks each associated with a different ASN.

5. The method of claim 4, further comprising:
    receiving, by the router, a third BGP routing update over an external BGP (eBGP) session with one of the other multi-tier networks; and
    based upon receiving the third BGP routing update over the eBGP session, assigning a brick ID value to the third BGP routing update that is a same value as the brick ID value assigned to the router receiving the third BGP routing update.

6. A routing device comprising:
    a processing unit;
    the routing device configured to perform operations, the operations comprising:
        receiving, by the routing device, a routing update, wherein the routing device is part of a brick of routing devices within a network area that are assigned a same brick identifier (ID) value;
        determining that the routing update is associated with the brick ID value of the routing device receiving the routing update; and based upon determining that the routing update is associated with the same brick ID value, processing the received routing update as an intra-brick routing update, wherein the intra-brick routing update is processed using a fewer number of steps than the number of steps required in a step for performing a standard border gateway protocol (BGP) path selection process.

7. The routing device of claim 6, the operations further comprising:
receiving, by the routing device, a second routing update;
determining that the second routing update is associated with a brick ID value that is different from the brick ID value of the routing device receiving the second routing update; and
based upon determining that the second routing update is associated with the different brick ID value, processing the second routing update as an inter-brick routing update.

8. The routing device of claim 6, wherein the routing update is a border gateway protocol (BGP) routing update that is received over an internal BGP (iBGP) session from another routing device within the network area.

9. The routing device of claim 6, wherein the intra-brick routing update converges faster than the standard BGP path selection process.

10. The routing device of claim 6, wherein the first routing update is a first border gateway protocol (BGP) routing update, the operations further comprising:
receiving, by the routing device, a second BGP routing update over an external (eBGP) session with a second network area, wherein the second BGP routing update does not have a brick ID attribute; and
based upon receiving the second BGP routing update over the eBGP session, assigning a brick ID value to the second BGP routing update that is a same value as the brick ID value assigned to the routing device.

11. The routing device of claim 6, wherein the routing device operates as part of the brick of routing devices within a multi-tier network, wherein routing devices within the multi-tier network are organized into a plurality of bricks, wherein each brick is assigned a unique brick ID value within the multi-tier network.

12. The routing device of claim 11, wherein the network area is a multi-tier network comprising at least three tiers, and wherein bricks within the multi-tier network are organized as groups of routing devices of the first and second tiers.

13. The routing device of claim 6, the operations further comprising:
for routing updates sent to routing devices in a second network area:
sending the routing updates without a brick ID attribute; and
for routing updates sent to routing devices within the network area:
sending the routing updates that include a brick ID attribute, the brick ID attribute having the brick ID value of the ingress routing device for the routing update.

14. The routing device of claim 6, the operations further comprising:
receiving an indication of the brick ID value; and
assigning the brick ID value to the routing device.

15. A computer-readable storage medium storing computer-executable instructions for causing a routing device to perform operations, the operations comprising:
receiving, by the routing device, a first border gateway protocol (BGP) routing update, wherein the routing device is part of a group of routing devices within a network area that are assigned a same group identifier (ID) value;
determining that the first BGP routing update is associated with a group ID value that is a same value as the group ID value of the routing device; and
based upon determining that the BGP routing update is associated with the same group ID value, processing the first BGP routing update as an intra-group routing update, wherein the intra-group routing update is processed as a preferred routing update using a fewer number of steps than the number of steps required in a step for performing a standard BGP path selection process;
receiving, by the routing device, a second BGP routing update,
determining that the second BGP routing update is associated with a group ID value that is different from the group ID value of the routing device; and
based upon determining that the second BGP routing update is associated with the different group ID value, processing the second BGP routing update as an inter-group routing update, wherein the inter-group routing update is processed using the standard BGP path selection process.

16. The computer-readable storage medium of claim 15, the operations further comprising:
receiving, by the routing device, a third BGP routing update over an external (eBGP) session with a second network area, wherein the third BGP routing update does not have a group ID attribute; and
based upon receiving the third BGP routing update over the eBGP session, assigning a group ID value to the third BGP routing update that is a same value as the group ID value assigned to the routing device.

17. The computer-readable storage medium of claim 15, the operations further comprising:
for routing updates sent to routing devices in a second network area:
sending the routing updates without a group ID attribute; and
for routing updates sent to routing devices within the network area:
sending the routing updates that include a group ID attribute, the group ID attribute having the group ID value of the ingress routing device for the routing update.

18. The computer-readable storage medium of claim 15, wherein the routing device operates as part of the group of routing devices within a multi-tier network, wherein routing devices within the multi-tier network are organized into a plurality of groups, and wherein each group is assigned a unique group ID value within the multi-tier network.

* * * * *